Patented Sept. 5, 1939

2,171,965

UNITED STATES PATENT OFFICE 2,171,965

OILY TO RESINOUS CONDENSATION PRODUCTS AND A PROCESS OF PREPARING THEM

Adolf Weihe, Bad Soden in Taunus, Germany, assignor to Deutsche Celluloid Fabrik, Eilenburg, Germany No Drawing. Application March 3, 1936, Serial No. 66,972. In Germany March 13, 1935

12 Claims. (Cl. 260—72)

The present invention relates to resinous condensation products and to a process of preparing them.

During the alkaline condensation of the urethanes with formaldehyde there are obtained well defined crystallizable methylol compounds which possess the remarkable property of decomposing at a raised temperature, while splitting off formaldehyde.

Now I have found that during the acid condensation of the carbamic acid esters with aldehydes products of a resin character which are not crystallizable are obtained. Among others the carbamic acid esters of the higher alcohols are suitable for the condensation because resin-like products are obtained particularly readily therefrom.

The reaction may be carried out for instance as follows: 1 mol of the carbamic acid ester is mixed with at least 1 mol of an aqueous formaldehyde solution of 30 to 40 per cent. strength, the mixture is heated in order to cause at least part of the carbamic acid ester to dissolve and some acid or acid reacting compound is added. If, for instance, 10 cc. of concentrated hydrochloric acid are added, the mixture generally heats itself very strongly; turbidity is formed and after a few minutes there separates, according to the urethane used, a more or less viscous, colorless, strongly refractive mass.

The condensation is terminated on the water bath by heating the mixture for instance to at least 80° C. preferably for at least 3 hours; the aqueous layer is then separated and the product is washed with hot water until the reaction is neutral.

The condensation is effected in the same manner also by other mineral acids, such as phosphoric acid or boric acid, as well as by acid salts, such as zinc chloride or acid sodium phosphate. Organic acids, for instance lactic acid, oxalic acid, crotonic acid, trichloro-acetic acid, oxalic acid mono-ethyl ester and others have a less strongly condensing action, but they are also useful. In order to obtain a resin-like condensation product it is in this case suitable to heat the mixture for a prolonged time. Formic acid contained in the commercial formaldehyde suffices already, if the mixture is heated for a prolonged time, for obtaining resinous condensation products.

When the acid and the excess of formaldehyde have been washed out, the condensation products may preferably be heated under reduced pressure, small quantities of water and formaldehyde being eliminated during this operation. The resins obtained are odorless and at room temperature they are solid to viscous and ropy.

Owing to the viscosity of their solutions, the products obtained must be regarded as hemi-colloidal.

In the case of carbamic acid methyl ester and carbamic acid ethyl ester it is difficult to obtain hemi-colloidal products. On standing for some time the condensation products are permeated by crystals which are composed as follows:

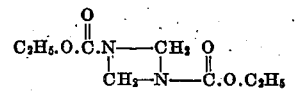

These compounds may be obtained from the primary condensation product of the methyl-urethane and ethyl-urethane by heating with glacial acetic acid.

If the mixture of ethyl-urethane or methyl-urethane is boiled for a prolonged time in a reflux condenser together with formaldehyde and in the presence of acid condensing agents, resinous products are obtained which by heating them with glacial acetic acid, can no longer be decomposed into crystallizable compounds, particularly if the condensation products are subsequently subjected to a treatment in the heat under a strongly reduced pressure.

As carbamic acid esters there may be used the aliphatic carbamic acid esters, as the aforenamed methyl ester and ethyl ester; furthermore propyl-, butyl-, isobutyl-, amyl-, hexyl-, heptyl-, octyl- or isooctyl esters of carbamic acid; hydroaromatic esters, such as cyclohexyl-, methylcyclohexyl- and isobornyl esters; aralkyl esters, such as benzyl ester; aromatic esters, such as phenyl- and cresyl-ester; furthermore esters of carbamic acids with other compounds containing alcoholic hydroxyl, for instance glycol-monoethyl-ether, ethanol-amine or glycerine-acetaldehyde-acetal. The carbamic acid may be substituted at the nitrogen by alkyl radicals, such as methyl, ethyl, propyl or by aryl radicals such as phenyl or cresyl.

As aldehydes there may be used in the first line lower aliphatic aldehydes, such as formaldehyde or acetaldehyde; furthermore substances splitting off these aldehydes.

The new condensation products obtained are oily to resinous bodies. They are soluble in most of the organic solvents, for instance in alcohols, such as methyl-, ethyl-, propyl- or butyl-alcohol; in aromatic hydrocarbons, such as benzene, toluene, xylene; in chlorinated hydrocarbons and in esters. The condensation products obtainable from the carbamic acid esters of higher aliphatic and aromatic alcohols dissolve also in benzines and paraffine oil. The products are clear and colorless. They are either odorless or have a weak oil-like odor. They are resistant to weak acids and alkalies.

The following examples serve to illustrate the invention, but they are not intended to limit it thereto, the parts being by weight:

1. 117 parts of carbamic acid-isobutyl ester are mixed with 90 parts of formaldehyde solution of 40 per cent. by volume and dissolved by aid of heat. 12 parts of concentrated hydrochloric acid are then added. After the reaction which is at first very violent is complete the mixture is heated in a reflux apparatus, while stirring, to 80° C. to 90° C. After 8 hours the mixture is allowed to cool and the aqueous layer is taken off from the resin which, when hot, is liquid. The resin is washed, while vigorously stirring it, with hot water until the acid is removed. The resin is then introduced, while still hot, into a distillation vessel and exposed for 5 hours at 100° C. to a reduced pressure of 0.7 mm.

The product is colorless, odorless and solid at room temperature. It is completely insoluble in water, but soluble in most of the organic solvents.

2. 145 parts of carbamic acid cyclohexyl ester are mixed with 100 parts of a formaldehyde solution of 35 per cent. strength, the mixture is stirred for one hour, while heating it to 50° C. and then mixed with 20 parts of highly concentrated lactic acid. The whole is boiled for 15 hours in a reflux apparatus and then allowed to cool. The resin is then separated. The further treatment is the same as described in Example 1.

The condensation product is nearly colorless and odorless. It is solid at room temperature and has a softening point of 60° to 65° according to Krämer-Sarnow, acid number=0. The product is soluble in ketones, esters and hydrocarbons and, when being heated, also in vegetable oils.

3. 1 kilogram of the urethanes of hexyl-alcohol and heptyl-alcohol (the alcohols are, for instance, obtained, besides others, during the reduction of carbon monoxide) is mixed with 1 kilogram of formaldehyde solution of 40 per cent. by volume and the mixture is dissolved as much as possible by heating it on the water bath and repeatedly shaking it. The reaction vessel is then brought into an oil bath and heated to boiling. When boiling sets in 50 grams of glycolic acid are added in small portions.

After a three hours' boiling the mass is allowed to cool and the aqueous layer is removed. The condensation product is repeatedly washed with water until it is practically free from acid. To the last washing water a small quantity of ammonia is added.

The water is separated as much as possible, the condensation product is introduced into a distilling flask and heated to 100° C. to 120° C. at first under a reduced pressure of 20 mm. As soon as the condensation product has become clear and transparent, it is heated to 220° C. and evacuated to 1 mm. A small quantity of water still distils, owing to an inferior after-condensation, as well as formaldehyde. As soon as the reduced pressure remains constant, that is volatile constituents are removed, this treatment is interrupted.

There is obtained a thick colorless oil having the acid number 0.

It is soluble in all the usual solvents, including benzines and paraffinic oil.

4. 1 kilogram of the carbamic acid ester of the glycol-monomethyl-ether is dissolved in 1.2 kilograms of formaldehyde of 40 per cent. by volume by heating. 45 grams of crystallized zinc chloride are added and the mixture is boiled for 3 hours in a reflux apparatus. After cooling, the aqueous layer is separated. The further treatment occurs as described in Example 3. The condensation product is a colorless ropy balm. The acid number is 0; the product is soluble in all the usual solvents with the exception of the benzines.

5. 1 kilogram of the carbamic acid ester of the glycerine-acetaldehyde-acetal

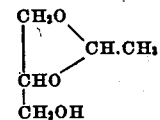

is dissolved in 800 grams of formaldehyde of 40 per cent. by volume. After the addition of 70 grams of oxalic acid mono-ethyl ester the whole is boiled for 4 hours in a reflux apparatus. The further treatment is the same as described in Example 3.

There is obtained a colorless neutral oil having the viscosity of castor oil. The condensation product is soluble in all the usual solvents with the exception of the benzines.

6. 1 kilogram of carbamic acid phenyl-ester is heated together with 2.5 kilograms of formaldehyde of 40 per cent. by volume. After the addition of 30 cc. of normal hydrochloric acid the whole is boiled in a reflux condenser until the separation of the resin is complete. The aqueous layer is separated and the resin is introduced, while still hot, into a distilling flask. The water is eliminated by heating to 80° C. under reduced pressure.

The condensation product is colorless, it smells weakly of formaldehyde. When cold it is non-pliable and can be pulverized. It is soluble in the usual solvents. On heating it gradually becomes insoluble.

Contrary to the hitherto known resins containing phenol, it shows no discoloration on exposure to light.

7. 1 kilogram of carbamic acid isobornyl ester is heated together with 750 grams of formaldehyde of 40 per cent. by volume for 6 hours to 95° C. to 98° C., while vigorously stirring and adding 60 grams of primary sodium ortho-phosphate.

The whole is then allowed to cool, the aqueous layer is removed and the condensation product is repeatedly washed with hot water.

The resin is heated in open dishes for 48 hours to 110° C.

It is solid at room temperature and has a softening point of 80° according to Krämer-Sarnow.

It dissolves in the usual solvents as well as in oil of turpentine and its substitution products of the terpene series.

8. 1 kilogram of carbamic acid methyl ester is dissolved in 1.5 kilograms of formaldehyde of 35 per cent. by volume and this solution is mixed with 50 cc. of concentrated hydrochloric acid. The violent reaction which occurs is moderated by cooling.

Two layers are formed. The aqueous top layer is removed, the condensation product is freed from the water under reduced pressure and then heated to 250° C. in a closed vessel.

The colorless resin obtained is solid at room temperature. It is soluble in all the usual solvents with the exception of the benzines.

9. 1 kilogram of carbamic acid ethyl ester is dissolved in 1.2 kilograms of formaldehyde of 40 per cent. by volume which contains 0.3 per cent. of formic acid. The solution is heated for 8 hours in a reflux condenser to 100° C. The aqueous layer is separated and the soft resin obtained is freed from water and other volatile substances as described in Example 3.

At room temperature the condensation product is a viscous colorless balm.

10. 165 grams of N-phenyl-carbamic acid ethyl ester is fused together with 60 grams of paraformaldehyde and after the addition of 5 grams of boric acid the fused mass is heated for 4 hours to 160° C.

The condensation product is colorless and non-pliable at room temperature. It dissolves in all the usual solvents.

11. 1 kilogram of carbamic acid methyl ester is dissolved in 1 kilogram of paraldehyde and after the addition of 20 grams of phosphoric acid of 86 per cent. strength the solution is heated for 6 hours at 145° C. in the autoclave. The excess of paraldehyde and the reaction water are distilled under reduced pressure.

As residue there is obtained a ropy resin which is semi-solid at room temperature and is soluble in all the usual solvents with the exception of the benzines.

12. 1 kilogram of the urethane of ethyl hexanol (isoctanol) is mixed with 600 grams of formaldehyde of 40 per cent. by volume. The mixture is heated to 80° C., while stirring. 40 cc. of concentrated hydrochloric acid are then added and the whole is boiled for 5 hours in a reflux condenser.

After cooling, a thick, nearly colorless oil floats on the aqueous layer. The aqueous layer is removed and the oil is washed with hot water until neutral.

The oil is then freed from the water and the excess of formaldehyde at a temperaure of 120° C. and under reduced pressure.

The product has a weakly oil-like odor and possesses nearly the same consistency as the castor oil.

13. 1 kilogram of benzyl urethane is mixed with 670 grams of formaldehyde of 40 per cent. by volume and the mixture is heated, while stirring, to 80° C. 50 grams of potassium bisulfate are then added and the whole is heated in a reflux apparatus for 5 hours to 100° C.

The further treatment is the same as described in Example 12.

The condensation product is an odorless, colorless, strongly refractive resin of the acid number 0. Its softening point lies at 45° C.

I claim:

1. In the process of preparing oily to resinous condensation products the step which consists in reacting components consisting essentially of an aldehyde of the group consisting of formaldehyde and acetaldehyde and an ester of a carbamic acid with an alcohol containing more than two carbon atoms at a temperature above about 80° C. and in the presence of a compound showing an acid reaction.

2. In the process of preparing oily to resinous condensation products the step which consists in reacting components consisting essentially of an aldehyde of the group consisting of formaldehyde and acetaldehyde and an ester of a carbamic acid with an alcohol containing more than two carbon atoms at a temperature above about 80° C. in the presence of a compound of acid reaction and maintaining the elevated temperature for at least 3 hours.

3. In the process of preparing oily to resinous condensation products the step which consists in reacting components consisting essentially of an aldehyde of the group consisting of formaldehyde and acetaldehyde and an ester of carbamic acid with an aliphatic alcohol containing more than two carbon atoms at a temperature above about 80° C. in the presence of a compound of acid reaction and maintaining the elevated temperature for at least 3 hours.

4. In the process of preparing oily to resinous condensation products the step which consists in reacting components consisting essentially of an aldehyde of the group consisting of formaldehyde and acetaldehyde and an ester of carbamic acid with an aliphatic alcohol containing more than two carbon atoms at a temperature above about 80° C. in the presence of a compound of the group consisting of strong mineral acids and carboxylic acids and the acid salts thereof, and maintaining the elevated temperature for at least 3 hours.

5. In the process of preparing oily to resinous condensation products the step which consists in reacting components consisting essentially of formaldehyde and an ester of carbamic acid with an aliphatic alcohol containing more than two carbon atoms at a temperature above about 80° C. in the presence of a compound of the group consisting of strong mineral acids and carboxylic acids and the acid salts thereof, and maintaining the elevated temperature for at least 3 hours.

6. In the process of preparing oily to resinous condensation products the step which consists in heating for about 5 hours components consisting essentially of carbamic acid isooctyl ester and an aqueous solution of formaldehyde of 40 per cent. by volume in the presence of hydrochloric acid at temperatures of about 100° C. and then distilling the volatile products at a reduced pressure and at temperatures of about 120° C.

7. In the process of preparing oily to resinous condensation products the step which consists in heating for about 5 hours components consisting essentially of carbamic acid benzyl ester and an aqueous solution of formaldehyde of 40 per cent. by volume in the presence of potassium bisulfate at temperatures of about 100° C. and then distilling the volatile products at a reduced pressure and at temperatures of about 120° C.

8. The oily to resinous condensation products of components consisting essentially of an aldehyde of the group consisting of formaldehyde and acetaldehyde and an ester of a carbamic acid with an alcohol containing more than two carbon atoms, said products being clear, colorless, soluble in organic solvents and indifferent against weak alkalies and acids.

9. The oily to resinous condensation products of components consisting essentially of an aldehyde of the group consisting of formaldehyde and acetaldehyde and an ester of a carbamic acid with an aliphatic alcohol containing more than two carbon atoms, said products being clear, colorless, soluble in organic solvents and indifferent against weak alkalies and acids.

10. The oily to resinous condensation products of components consisting essentially of formaldehyde and an ester of carbamic acid with an aliphatic alcohol containing more than two carbon atoms, said products being clear, colorless, soluble in organic solvents and indifferent against weak alkalies and acids.

11. The oily to resinous condensation products of components consisting essentially of formaldehyde and carbamic acid isooctyl ester, said products being clear, colorless, soluble in organic solvents and indifferent against weak alkalies and acids.

12. The oily to resinous condensation products of components consisting essentially of formaldehyde and carbamic acid benzyl ester, said products being clear, colorless, soluble in organic solvents and indifferent against weak alkalies and acids.

ADOLF WEIHE.